March 8, 1932. W. R. ROBINSON 1,849,028
TRUCK
Filed Aug. 31, 1929   2 Sheets-Sheet 2
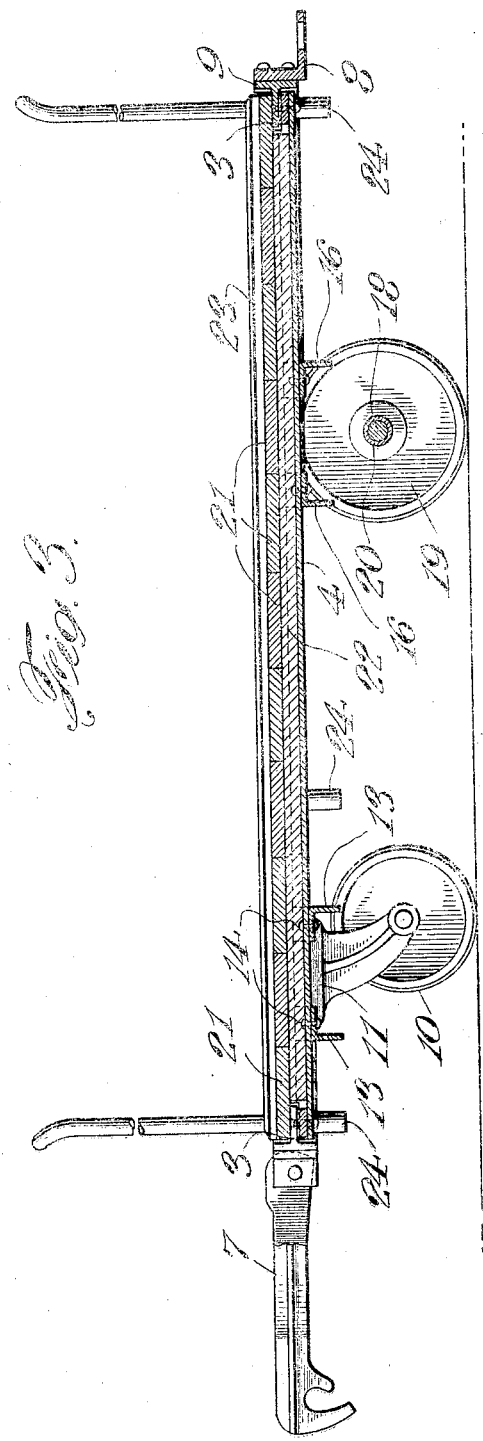
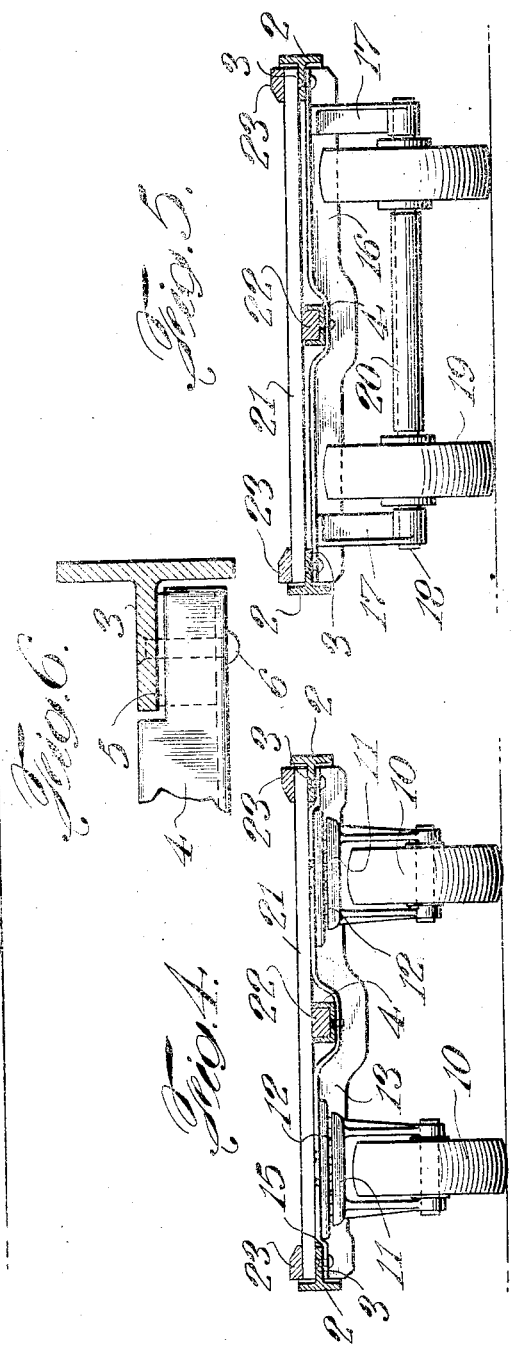
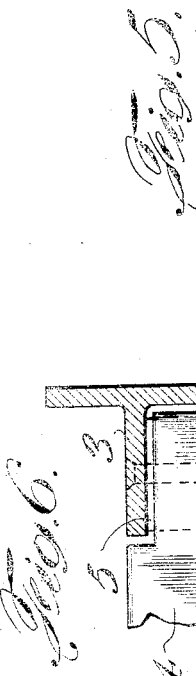
INVENTOR
William R. Robinson
BY
ATTORNEYS Patented Mar. 8, 1932

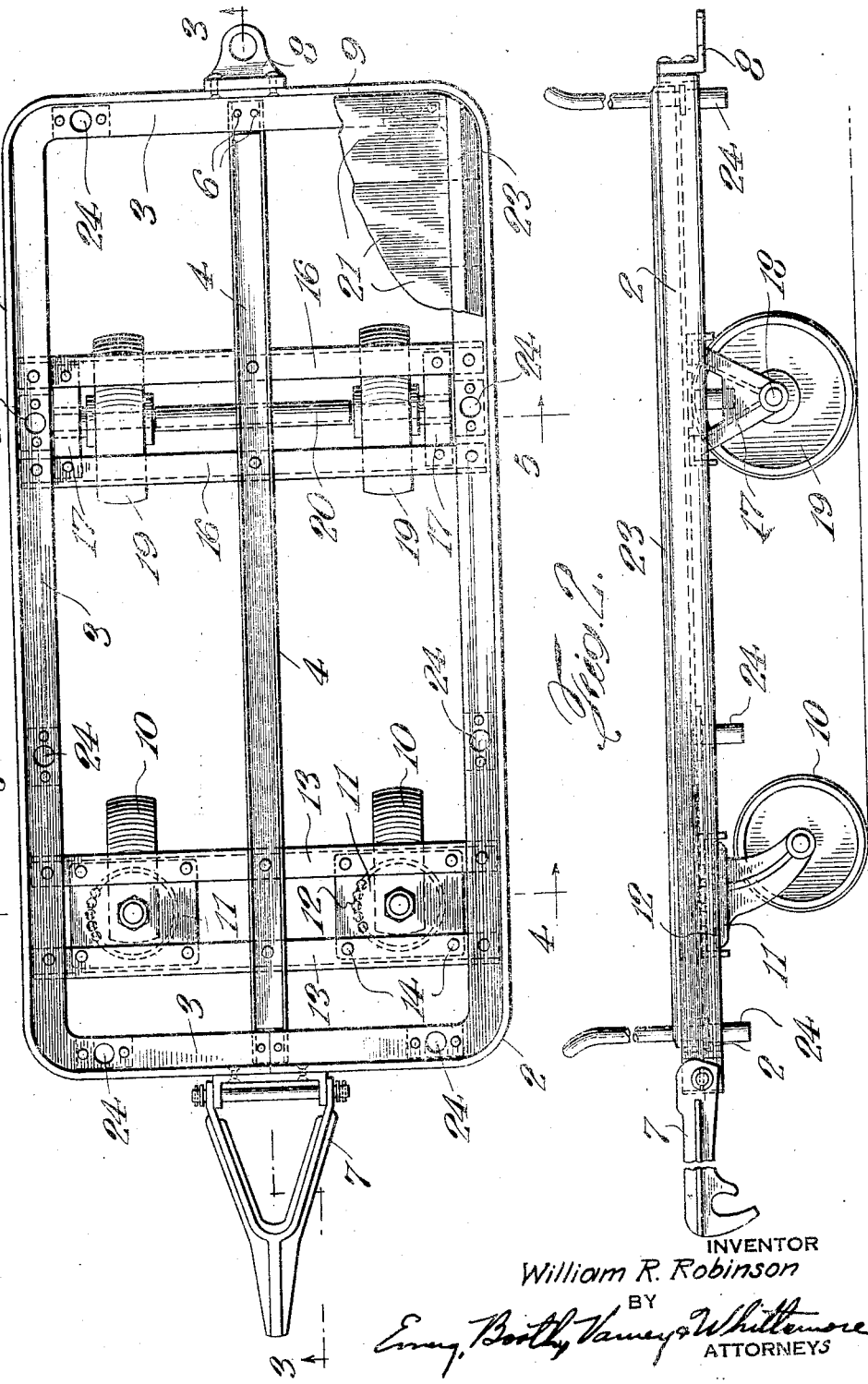

1,849,028

UNITED STATES PATENT OFFICE

WILLIAM R. ROBINSON, OF NILES, OHIO, ASSIGNOR TO THE OHIO GALVANIZING & MANUFACTURING CO., OF NILES, OHIO, A CORPORATION OF OHIO

TRUCK

Application filed August 31, 1929. Serial No. 389,647.

This invention relates to trucks and more particularly to trailer trucks adapted to be used in trains drawn by tractors.

It is an object of the invention to provide a rugged, sturdy truck of simple construction which will be capable of withstanding for extended periods of time the extremely rough handling to which trucks of this type are subjected in every day use.

Other objects and advantages of the invention will appear hereinafter.

A preferred embodiment of the invention selected for purposes of illustration is shown in the accompanying drawings, in which, Figure 1 is a top plan view, the floor boards being removed to better illustrate the construction of the truck.

Figure 2 is a side elevation.

Figure 3 is a longitudinal section on the line 3—3 of Figure 1.

Figure 4 is a transverse section on the line 4—4 of Figure 1.

Figure 5 is a transverse section on the line 5—5 of Figure 1.

Figure 6 is an enlarged sectional view showing the connection between the outside frame and the longitudinal draft bar.

Referring to the drawings, the outside frame 1 is preferably formed from a single piece of metal such as the T-iron section illustrated in the drawings. The said frame is preferably rectangular in shape and is formed by bending the structural section to form rounded corners 2.

Attached to the horizontal flange 3 of the outside frame and extending longitudinally thereof from one end to the other so as to provide longitudinal reinforcement therefor is a draft bar 4, preferably of channel iron arranged with its flanges extending vertically upward. In order to provide a solid connection between the channel bar 4 and the horizontal flanges 3, filler blocks 5 are provided, and the bar 4 is rigidly secured to the flange 3 by means of rivets 6. As will be observed, at the front end of the truck the said rivets not only serve to secure the channel bar to the horizontal flange, but also serve to secure the abutting ends of the frame 1.

Also arranged at the ends of the truck are coupling members 7 and 8, the said members being secured to the vertical flange 9 of the frame 1 by means of rivets. As will be observed, the rivets which secure the coupling member 7 to the front end of the truck also serve to secure the abutting ends of the frame.

In order to provide for proper tracking of the trucks when used in trains, the front end of the truck is supported on a pair of caster wheels 10 which are of usual construction including ball bearings located between caster plates 11 and 12. In order to provide adequate support for the said caster wheels and also to provide transverse reenforcement for the truck frame, a cross bolster construction is provided comprising a pair of transverse members such as angle irons 13 having horizontal flanges connected to the horizontal flange of the frame member and having depending vertical flanges. The said transverse members are spaced apart sufficiently to receive the caster plates 12 between the depending flanges, and the said caster plates may be secured directly to the horizontal flanges by means of rivets 14.

In order to provide maximum structural strength both transverse and longitudinal, the members 13, instead of being cut away to pass the draft bar 4 are bent around the said bar as illustrated in Figure 4, and are riveted thereto. Also, in order to provide maximum wheel diameter and at the same time a low platform, the said transverse members 13 are bent upwardly slightly as illustrated at 15.

The rear end of the truck is also supported on a cross bolster construction comprising a pair of transverse members such as angle irons 16 having horizontal flanges which are secured to the horizontal flanges 3 of the frame, and which are spaced apart sufficiently to receive the rear axle hangers 17 between their depending vertical flanges, the said hangers being riveted to the horizontal flanges of the angle bars 16. The rear axle 18 is carried by said hangers and in turn carries wheels 19 which are spaced apart by means of a pipe spacer 20.

The truck frame thus constructed may be used to support any suitable form of carrying member such as a floor, box, basket, etc. In the truck illustrated in the drawings, a floor is provided comprising the floor boards 21 which are laid transversely and are supported on the horizontal flange 3 of the outer frame, the outer ends of the boards when thus laid being protected by the upper vertical flange of the outer frame. In order to provide intermediate support for the floor boards, a wooden filler member 22 may be inserted in the channel member 4, the said filler being of a thickness sufficient to support the under side of the floor boards. The said floor boards may be held in place by longitudinal stringers 23 which may be bolted at intervals to the horizontal flange 3.

Stake pockets 24 may be provided at intervals for supporting stakes or other devices for retaining articles on the floor. The said stake pockets may be conveniently mounted on the under side of the horizontal flange 3 and are preferably riveted thereto.

It will be understood that the invention may be variously modified and embodied within the scope of the subjoined claim.

I claim as my invention:

In a truck, in combination, a rectangular T-iron frame having vertical and horizontal flanges, an upturned channel iron connected to the horizontal flanges of said frame at opposite ends thereof, two pairs of transverse angle irons having horizontal flanges connected to the horizontal flanges of said frame at opposite sides thereof, said angle irons having depending vertical flanges, and being bent around said channel bar, a pair of caster wheels connected to the horizontal flanges of one pair of said angle irons between said depending vertical flanges, a pair of rear axle hangers connected to the horizontal flanges of the other pair of said angle irons between said depending vertical flanges, and a rear axle and rear wheels carried by said hangers.

In testimony whereof, I have signed my name to this specification this 26th day of August, 1929.

WILLIAM R. ROBINSON.